Dec. 28, 1965  R. O. WILSON  3,226,378
PROCESS FOR THE PURIFICATION OF NATURAL GUMS
Filed April 5, 1962  7 Sheets-Sheet 1

INVENTOR.
ROBERT O. WILSON
BY
his ATTORNEYS

Dec. 28, 1965   R. O. WILSON   3,226,378
PROCESS FOR THE PURIFICATION OF NATURAL GUMS
Filed April 5, 1962   7 Sheets-Sheet 4

INVENTOR.
ROBERT O. WILSON his ATTORNEYS

United States Patent Office 3,226,378
Patented Dec. 28, 1965

3,226,378
PROCESS FOR THE PURIFICATION OF NATURAL GUMS
Robert O. Wilson, Demarest, N.J., assignor to Thomas J. Lipton, Inc., Hoboken, N.J., a corporation of Delaware
Filed Apr. 5, 1962, Ser. No. 185,327
10 Claims. (Cl. 260—209)

This invention relates to natural gums, e.g., gum tragacanth; and, more particularly, it is concerned with a process for reducing the microbial contamination in these gums.

It is known that gum tragacanth and other natural gums are heavily contaminated by microorganisms. Therefore, it has been necessary to sterilize these gums, i.e., reduce the microbial contamination to an acceptable commercial level.

In the past, the contamination in certain materials has been alleviated by treating them with a chemical agent, e.g., ethylene oxide, propylene oxide, chlorine, and the like (U.S. Pat. No. 2,075,845). However, this procedure is inoperative for the natural gums, such as gum tragacanth. Although the chemical treatment reduces the amount of microorganisms in the gum, there is corresponding deleterious reaction between the chemical agent and the gum. That is, the properties of natural gum are altered, which is commercially undesirable.

The contamination in gums has also been reduced, in the past, by the prolonged heating of aqueous gum dispersions or solutions at elevated temperatures, e.g., 80° C. (U.S. Pat. No. 2,380,115). This procedure provides an end product which is a fully hydrated aqueous suspension or solution rather than the preferred dry powder.

It has now been discovered that the aforementioned problems can be solved by heating the natural gum in a chamber having a humid atmosphere. Thus, in accordance with one embodiment of this invention, shallow layers of powdered natural gum, e.g., gum tragacanth, are provided on trays in a chamber, e.g., a Proctor and Schwartz tray dryer. The gum layers are heated at an elevated temperature, preferably 160° to 190° F., initially at ambient humidity and subsequently at a relatively high humidity, preferably 50 to 85%. The treated gum is then dried, cooled and packaged to form the desired powdered end product.

Figure 1:
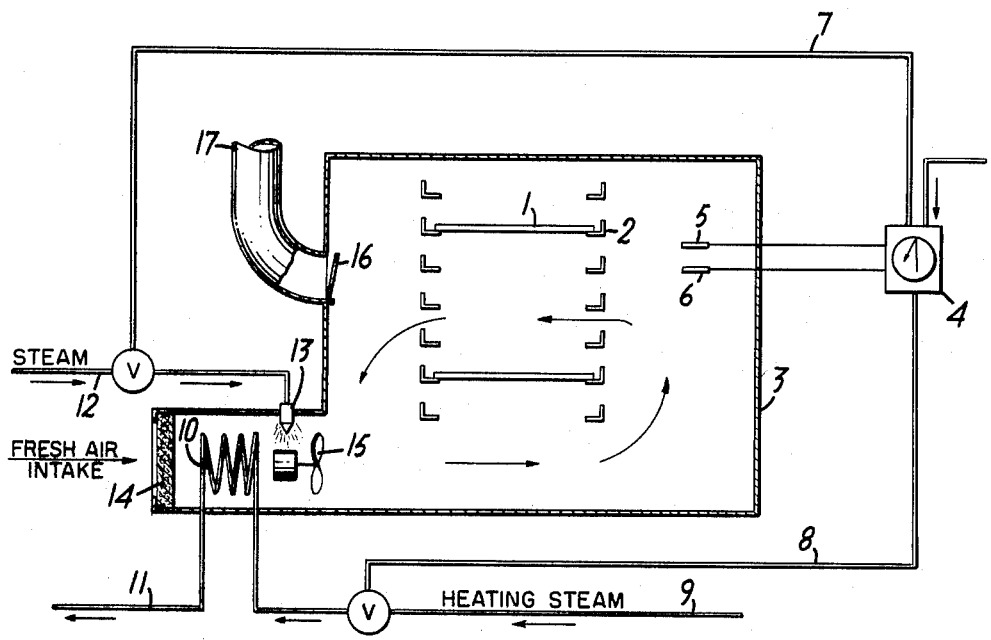

This invention may be more fully understood from the following description in conjunction with the accompanying drawings in which:

FIGURE 1 illustrates a dryer for reducing the microbial content in powdered natural gums; and FIGURES 2–7 demonstrate the parameters of time, temperature and relative humidity which can be employed for providing a natural gum with an acceptable contamination and gum viscosity level.

Although any known natural gum may be used in this invention, gum tragacanth is preferred. However, the following gums are also applicable: arabic, karaya, acacia, alginates, Irish moss and the others which are indicated here below. These natural gums are generally formed from plants, which yield water-soluble exudations or extractives. The mucilaginous solutions therefrom are employed as adhesives and thickening agents. For example, gum tragacanth, which is an exudation of shrubs of the genus Astragalus, contains an acidic and a neutral polysaccharide. The acidic portion on hydrolysis yields fucose, xylose, galactose, and galacturonic acid; and the neutral portion yields L-arabinose and D-galactose. Similarly, gum arabic is obtained from the bark of Acacia, particularly *Acacia senegal*, and is the calcium salt of arabic acid. Mesquite gum, which an exudation of the stems and branches of the desert shrub, *Prosopsis juliflora*, is a salt comparable to gum arabic; whereas damson gum is the exudation of the injured bark from a plum tree species. Likewise, slippery elm mucilage is a polysaccharide of L-rhamnose and D-galacturonic acid; and flaxseed mucilage is a polysaccharide of L-glactose and D-galacturonic acid. Mannogalactans, which are also within the scope of this invention, are found in the seeds of legumes; for example, locust bean or carob bean flour is provided from the endosperm of the seed of the Mediterranean locust tree (*Ceratonia siliqua*), whereas guar flour is a similar product from the endosperm of the guar bean (*Cyamopsis proraloides*). Mannogalactans are also found in the endosperm of other leguminous seeds, such as honey locust, flame tree, *Cassis occidentalis*, and the like. The glucomannans on the other hand are usually found in the corms of plants of the Araceae family, e.g., *Amorphophallus oncophyllus*, and *Amorphophallus rivieri*.

In the present invention, the natural gums are generally placed in a batch tray-type dryer, e.g., a Proctor & Schwartz unit, to reduce the contamination therein. However, rotary and turbo dryers are also applicable, since the agitation of "in process" materials provided by these drying units increases the amount of gum processed per unit volume of equipment. This provides a more uniform destruction of the microorganisms. Belt dryers (imperforate belt) and fluidized bed units are likewise suitable for this invention.

Turning now to FIGURE 1, a layer 1 of gum tragacanth or other natural gum is formed on tray 2 in a circulating hot air tray dryer 3. The thickness of this layer is preferably ¼ inch, since greater thicknesses, e.g., ½ inch, will not provide a product with a satisfactory level of microorganism contamination. The dryer is subsequently regulated to provide an ambient humidity, i.e., 3% relative humidity (R.H.), and the desired temperature, preferably between 160° and 190° F. The temperature and humidity regulation is provided by means of humidity control 4 in conjunction with wet bulb 5, dry bulb 6, humidity control line 7, temperature control line 8, heating steam line 9, heating coil 10 and condensate line 11. Steam is transported through line 12 and introduced into the dryer by means of spray nozzle 13. Air is introduced into the dryer through air filter 14 and heating coil 10; the air is circulated in the dryer by means of fan 15. After the air is circulated over the trays at the predetermined time, temperature and relative humidity, the exhaust damper 16 is opened and the air is removed from the dryer through exhaust duct 17.

After the natural gum in the trays is preheated at ambient humidity, steam is injected into the air stream to substantially increase the relative humidity in the dryer, preferably within the range of 50 to 85%. The gum layers are treated at this high humidity condition for the desired length of time, which is generally between 20 and 60 minutes.

It should be noted that two conflicting results are provided by this treatment. Firstly, there is an advantageous bacteriological purification, i.e., reduction in microbial contamination. Secondly, the viscosity of the gum is reduced, but this is undesirable if it becomes too low; by viscosity of dry powder as submitted in the specification and claims, I mean the viscosity as measured by providing a 1% aqueous suspension of the natural gum at 25° C. For example, it is known that the treatment of gum tragacanth at 80° C. for one hour at 75% R.H. causes degradation, i.e., reduction in viscosity. Conversely, heating for one hour at 80° C. with ambient humidity is ineffective for reducing the contaminating microorganisms. To reiterate, subminimal conditions in the dryer produce an unacceptable degree of bacteriological purification, while too stringent conditions damage the physiual properties, e.g., viscosity of the gum. Therefore, the parameters of time, temperature and relative humidity are critical in order to provide an acceptable product.

It should also be noted that the unacceptable levels of bacteriological purification and gum damage differ with each user. Therefore, the user should select the conditions of time, temperature and relative humidity to form a product which meets his requirements. By way of illustration, we consider a gum tragacanth to be commercially acceptable if its standard plate count (S.P.C.) does not exceed 200,000 per gram of gum (10% moisture basis) and if its viscosity in aqueous suspension is at least 85% of its viscosity before purification. This can be accomplished by subjecting finely divided particles of gum tragacanth in a ¼ inch layer to 60% relative humidity and 80° C. for about one hour under atmospheric pressure. A higher temperature or higher relative humidity causes some degradation of the gum, while lower temperatures and relative humidities are less effective in reducing the level of contaminating microorganisms.

Subsequent to the aforementioned high temperature-high humidity treatment of the natural gum, the humidity of the air in the dryer is returned to ambient conditions by shutting off the injection steam. However, the treated natural gum, e.g., gum tragacanth, is heated at about the treating temperature for an additional 10 to 15 minutes in order to dry any condensed moisture thereon. The dried, treated product is then cooled and packaged by any known technique.

Thus, in accordance with this invention, it is now possible to treat a natural gum at certain time, temperature and relative humidity conditions to provide a commercially acceptable powdered end product—that is, a product with the desired contamination level and with the desired viscosity level, if a 1% aqueous suspension at 25° C. is provided therefrom. Furthermore, the present invention overcomes the serious problems which occurred in the prior art methods.

The following example is submitted to illustrate but not to limit this invention. Unless otherwise indicated, all parts and percentages in the specification are based upon weight.

EXAMPLE I

Powdered gum tragacanth, having an untreated contamination level (S.P.C., i.e., standard plate count) of 1,400,000 per gram and an untreated viscosity of 421 centipoise per gram, was treated as indicated here below.

The gum was placed in trays in a Proctor and Schwartz tray-type dryer with a Foxboro humidity control to provide layers with ¼ in. thicknesses. The gum layers were heated at 172° F. for 30 minutes with air at ambient humidity. Steam was subsequently injected into the air stream to increase the humidity of the air to approximately 60%, i.e., a wet bulb temperature of 160° F. with a dry bulb temperature of 172° F. These conditions were held in effect for one hour. Then the humidity was returned to ambient conditions by shutting off the injection steam and by opening the exhaust damper slightly to purge the dryer of humid air. The treated gum was dried by maintaining the same temperature at ambient humidity for 15 minutes. The dry, treated gum was subsequently cooled and then removed from the trays and packed in sanitary containers.

The same procedure was repeated except the temperature, humidity and time conditions were varied as promulgated in Table I. The S.P.C. and viscosity values of the treated products were measured as also indicated in Table I.

Table I

| Treatment Temperature (° F.) | Treatment Humidity (Percent R.H.) | Treatment Time (Min.) | Standard Plate Count (S.P.C.) | Viscosity[b] (Centipoise) |
|---|---|---|---|---|
| Control[a] | | | 1,400,000 | 421 |
| 160 | 50 | 15 | 740,000 | 352 |
| 160 | 50 | 30 | 290,000 | 393 |
| 160 | 50 | 45 | 240,000 | 357 |
| 160 | 50 | 60 | 250,000 | 343 |
| 160 | 64 | 15 | 240,000 | 393 |
| 160 | 64 | 30 | 250,000 | 388 |
| 160 | 64 | 45 | 270,000 | 446 |
| 160 | 64 | 60 | 200,000 | 373 |
| 160 | 74 | 15 | 240,000 | 460 |
| 160 | 74 | 30 | 200,000 | 392 |
| 160 | 74 | 45 | 150,000 | 415 |
| 160 | 74 | 60 | 110,000 | 457 |
| 160 | 85 | 15 | 120,000 | 390 |
| 160 | 85 | 30 | 100,000 | 442 |
| 160 | 85 | 45 | 43,000 | 419 |
| 160 | 85 | 60 | 67,000 | 436 |
| 172 | 50 | 15 | (c) | 202 |
| 172 | 50 | 30 | 260,000 | 190 |
| 172 | 50 | 45 | 200,000 | 190 |
| 172 | 50 | 60 | 130,000 | 187 |
| 172 | 64 | 15 | 180,000 | 210 |
| 172 | 64 | 30 | 94,000 | 212 |
| 172 | 64 | 45 | 120,000 | 197 |
| 172 | 64 | 60 | 110,000 | 219 |
| 172 | 74 | 15 | 86,000 | 206 |
| 172 | 74 | 30 | 160,000 | 392 |
| 172 | 74 | 45 | 150,000 | 437 |
| 172 | 74 | 60 | 180,000 | 353 |
| 172 | 85 | 15 | 130,000 | 426 |
| 172 | 85 | 30 | 90,000 | 409 |
| 172 | 85 | 45 | 160,000 | 446 |
| 172 | 85 | 60 | 66,000 | 391 |
| 190 | 50 | 15 | 140,000 | 382 |
| 190 | 50 | 30 | 90,000 | 316 |
| 190 | 50 | 45 | 120,000 | 286 |
| 190 | 50 | 60 | 120,000 | 256 |
| 190 | 64 | 15 | 90,000 | 425 |
| 190 | 64 | 30 | 80,000 | 351 |
| 190 | 64 | 45 | 110,000 | 344 |
| 190 | 64 | 60 | 71,000 | 308 |
| 190 | 74 | 15 | 100,000 | 424 |
| 190 | 74 | 30 | 96,000 | 329 |
| 190 | 74 | 45 | 88,000 | 281 |
| 190 | 74 | 60 | 76,000 | 261 |
| 190 | 85 | 15 | 130,000 | 325 |
| 190 | 85 | 30 | 69,000 | 285 |
| 190 | 85 | 45 | 180,000 | 310 |
| 190 | 85 | 60 | 82,000 | 263 |

[a] Untreated raw gum.
[b] Determined by providing a 1% aqueous suspension corrected to a 10% moisture basis.
[c] Sample lost.

Figure 2:
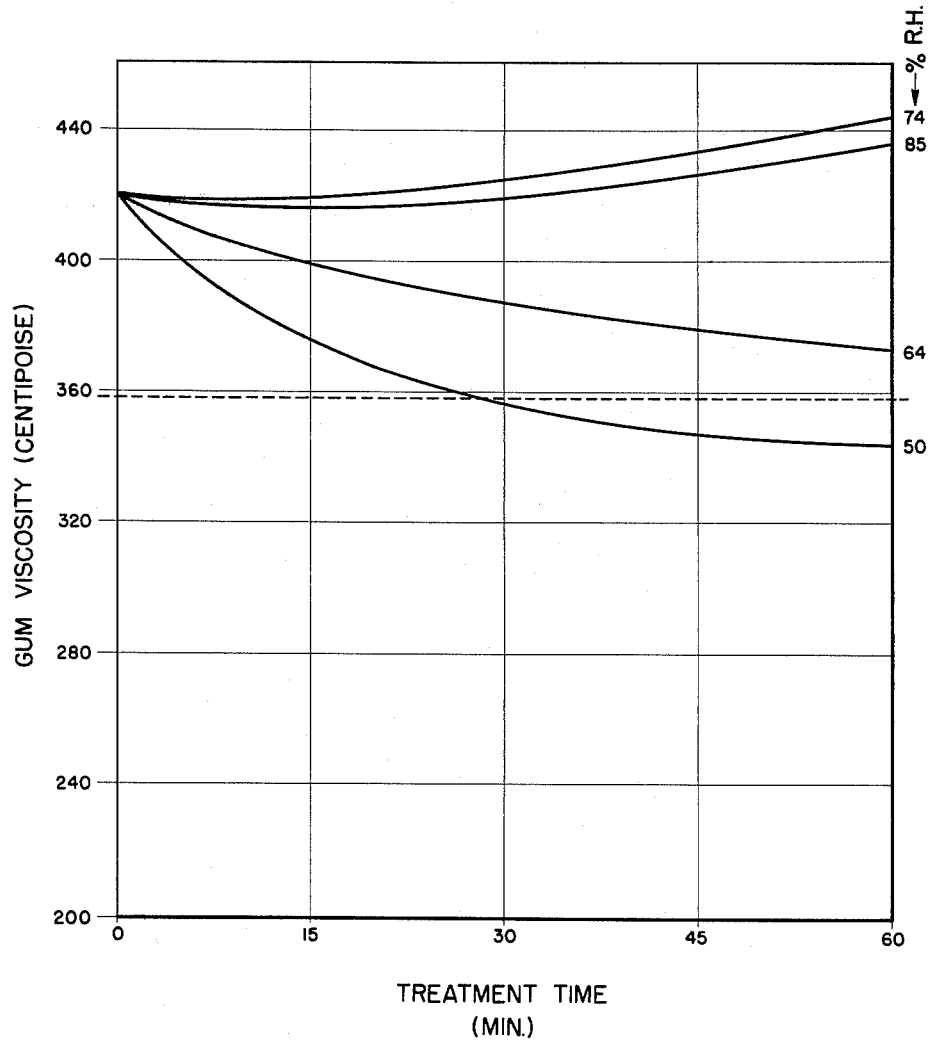
Figure 3:
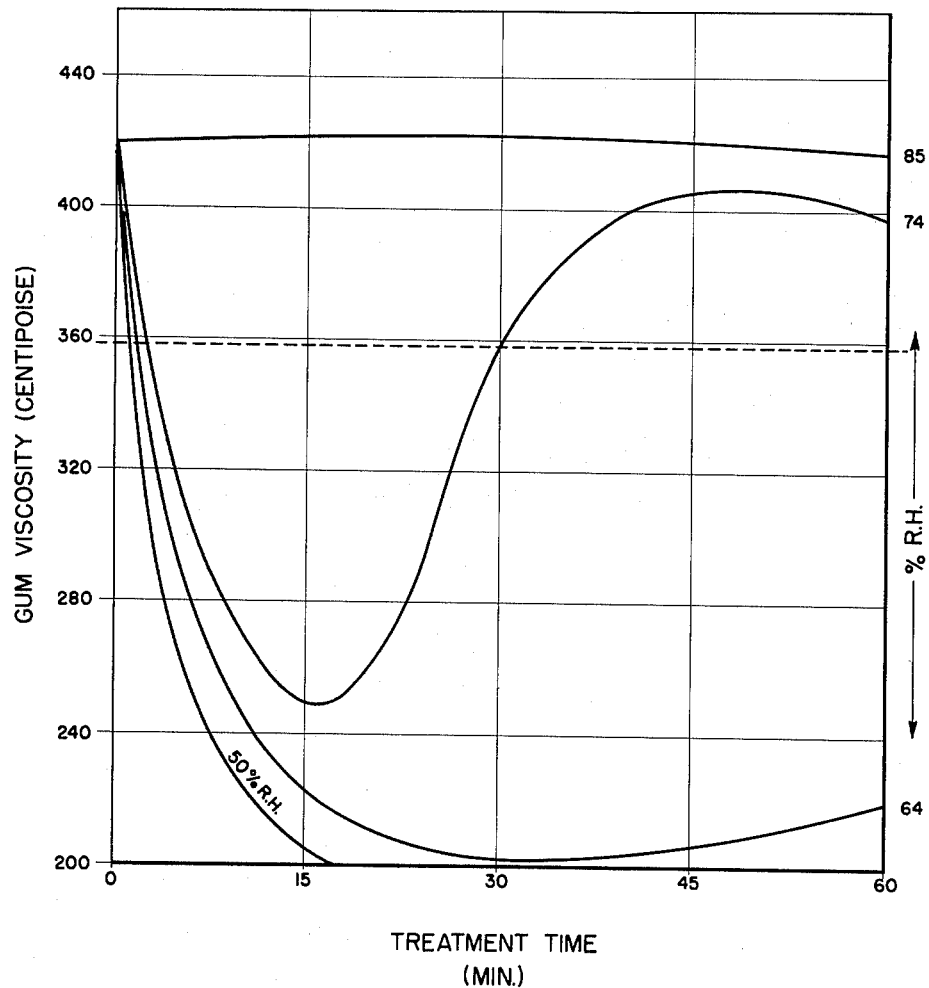
Figure 4:
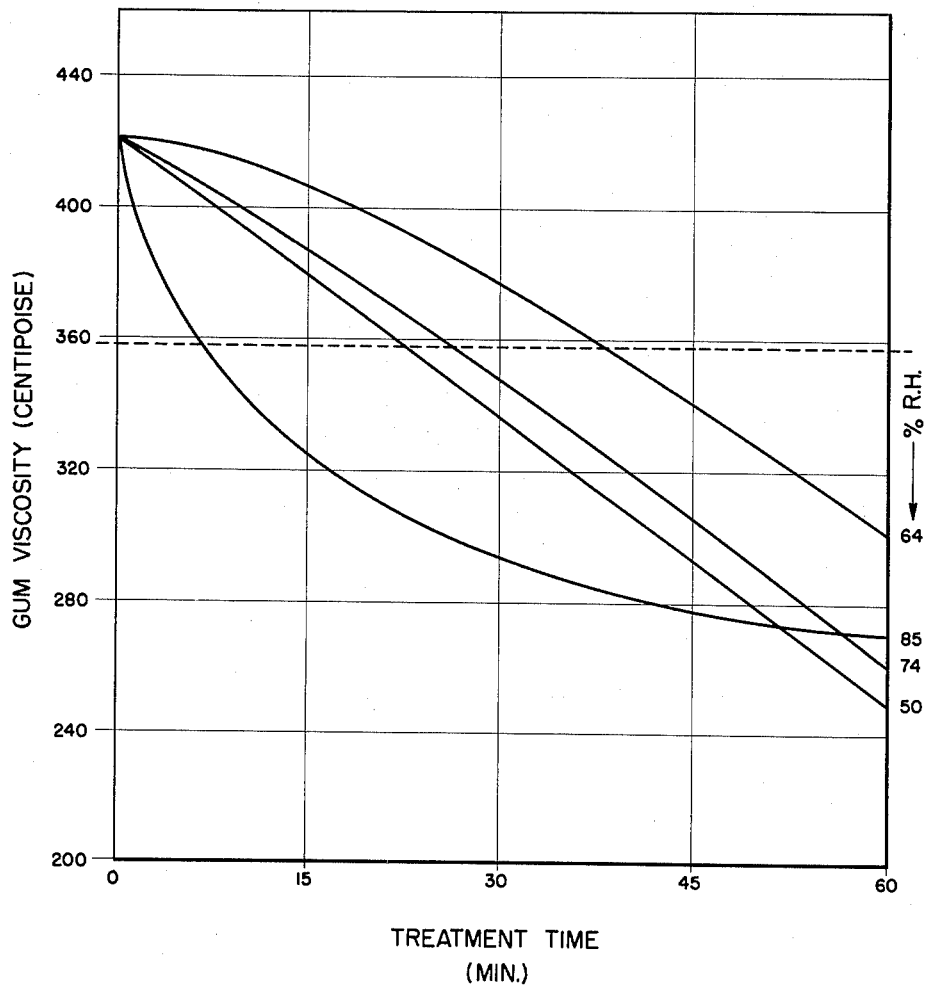

FIGURES 2 to 7 are graphs representing the data submitted in Table I. More specifically, FIGURE 2 demonstrates the viscosity measurements at a constant temperature of 160° F., with the relative humidity being varied between 50 and 85% and the time being varied between 0 and 60 minutes. FIGURE 3 shows a comparable relationship between viscosity, humidity and time at a fixed temperature of 172° F. Similarly, FIGURE 4 illustrates the viscosity-time-humidity parameters at a constant temperature of 190° F. It should be noted that an acceptable viscosity value in FIGURES 2 to 4 is 358 centipoises, i.e., 85% of 421 centipoises, or higher.

Figure 5:
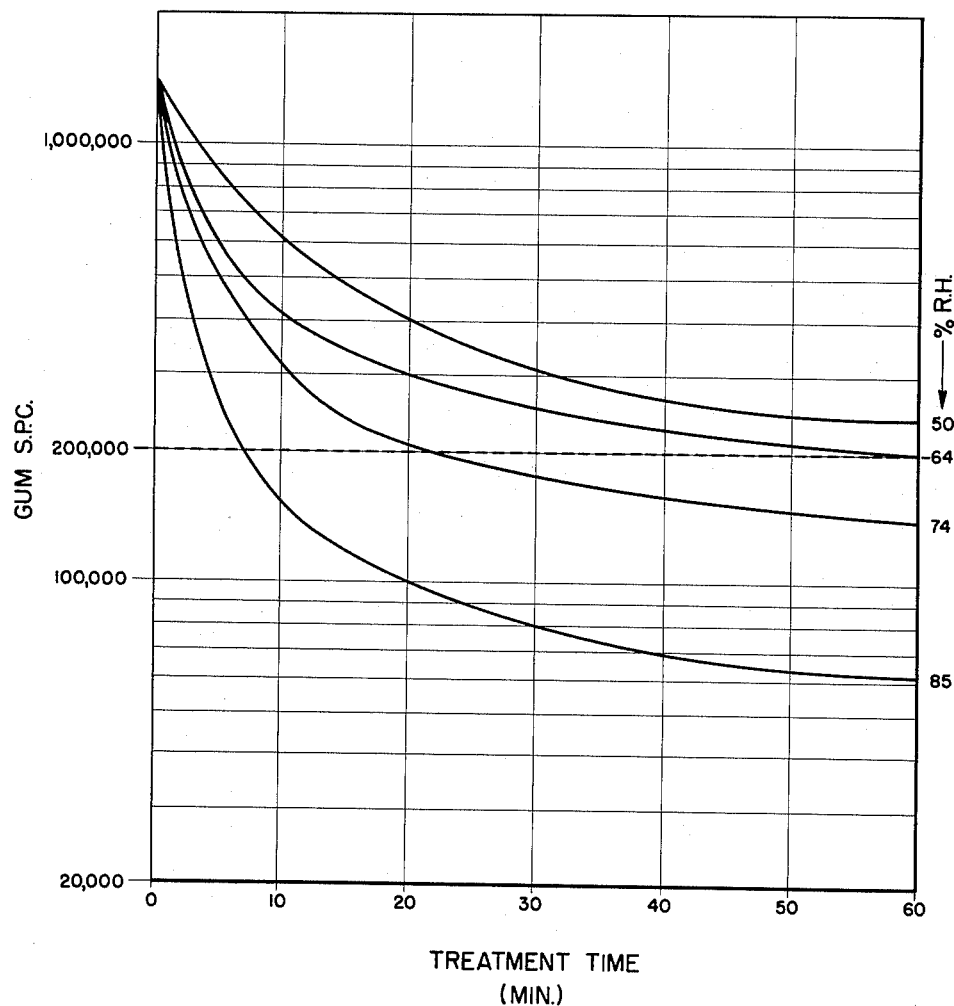
Figure 6:
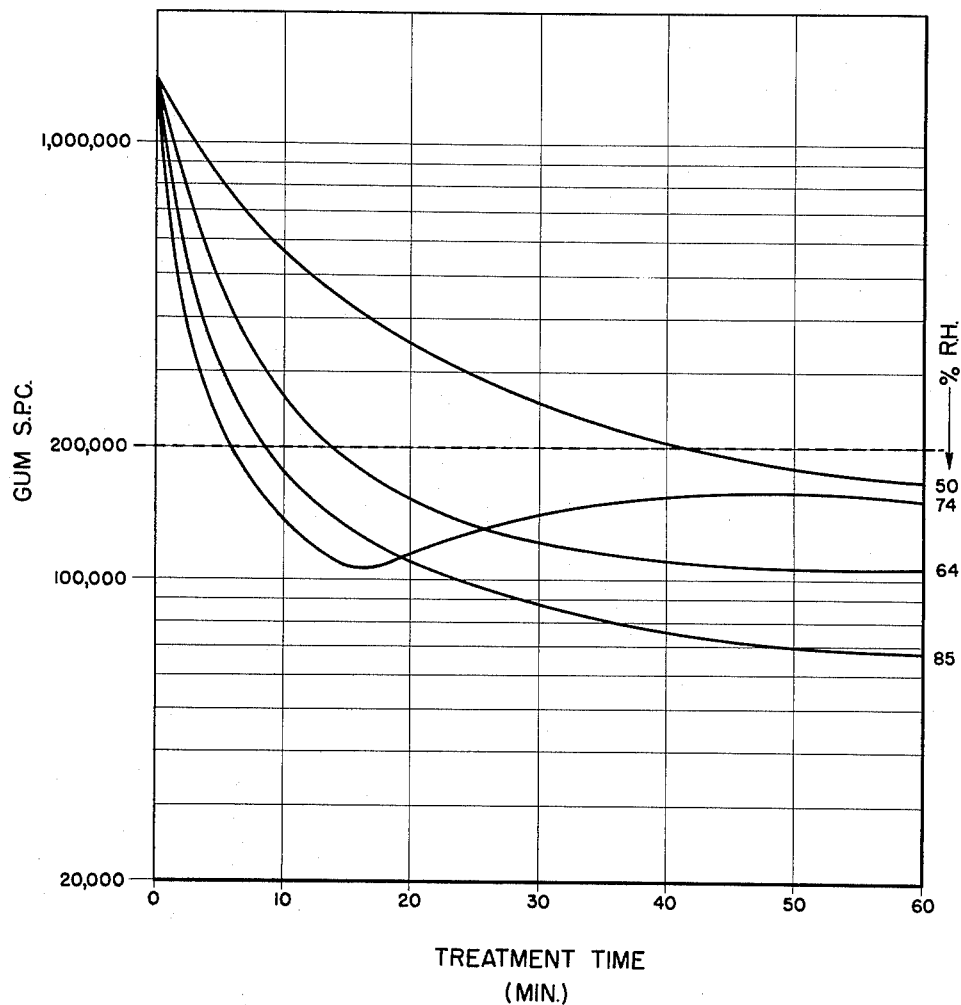
Figure 7:
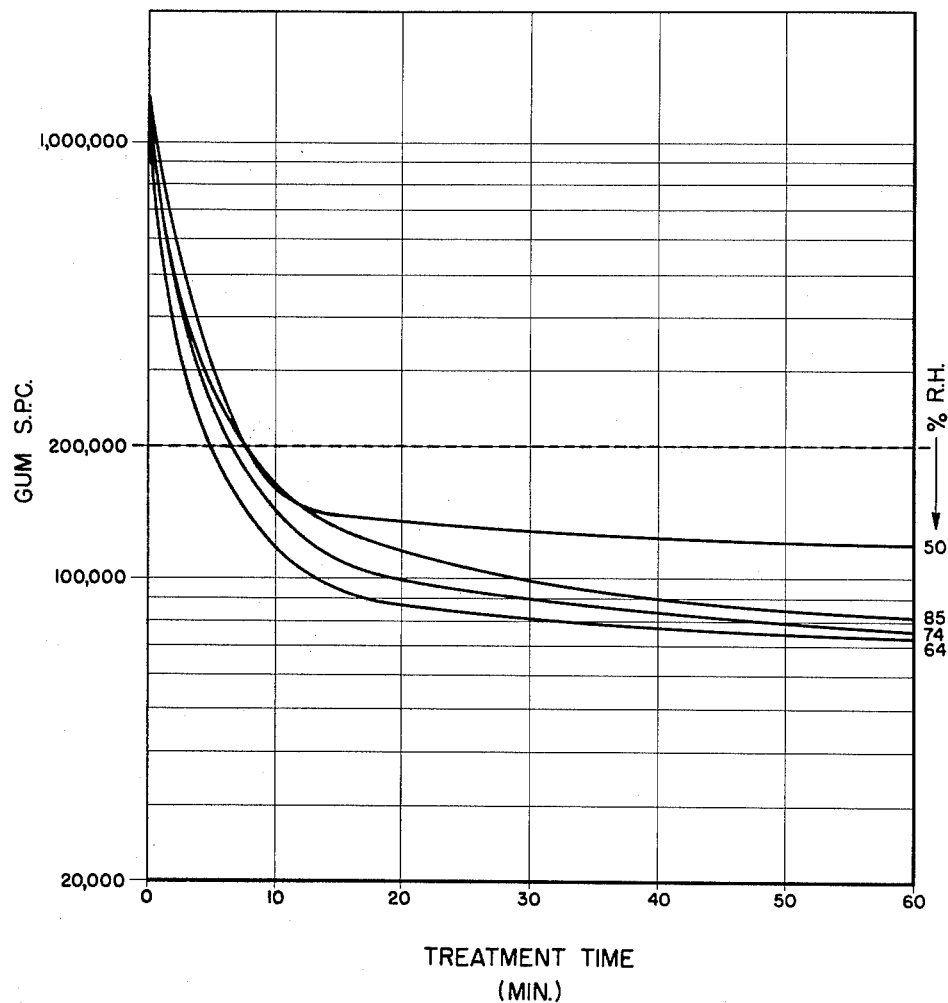

The relationship between the standard plate count (S.P.C.), time and relative humidity at a constant temperature of 160° F. is demonstrated in FIGURE 5; whereas FIGURE 6 illustrates the same relationship at a fixed temperature of 172° F. Similarly, FIGURE 7 depicts the parameters of S.P.C., time and relative humidity at a constant temperature of 190° F. With respect to FIGURES 5 to 7, the gum tragacanth is commercially suitable only if it has S.P.C. value of 200,000 or less.

It can be seen from Table I and FIGURE 2 that the following conditions must be used at 160° F. to provide a product with a satisfactory viscosity level:

50% R.H. with a maximum time of 27.5 min.;
64% R.H. with a maximum time of 60+ min.;
85% R.H. with a maximum time of 60+ min.; and
74% R.H. with a maximum time of 60+ min.

However, as shown in FIGURE 5, to have an acceptable contamination level for the treated gum tragacanth the following conditions must be employed at 160° F.:

64% R.H. with a minimum time of 58 min.;
74% R.H. with a minimum time of 21 min.; and
85% R.H. with a minimum time of 7 min.

Combining the results indicated in FIGURES 2 and 5, only the following conditions can be utilized to form an end product which is suitable from a contamination standpoint and also from a viscosity standpoint:

160° F., 64% R.H., 58 to 60+ min.;
160° F., 74 R.H., 21 to 60+ min.; and
160° F., 85% R.H., 7 to 60+ min.

FIGURE 3 demonstrates that an acceptable viscosity value at a temperature of 172° F. is obtained with the conditions as follows:

50 R.H. at a maximum time of 3 min.;
64% R.H. at a maximum time of 4 min.;
74% R.H. at a time up to 5 min. and also at a time between 30 and 60+ min; and
85% R.H. at a maximum time of 60+ min.

By analyzing FIGURE 6, it is evident that a treated tragacanth gum with a suitable S.P.C. value at a temperature of 172° F. is provided with conditions as follows:

50% R.H. with a minimum time of 41 min.;
64% R.H. with a minimum time of 15 min.;
74% R.H. with a minimum time of 6 min.; and
85% R.H. with a minimum time of 8.5 min.

Accordingly, the combination of FIGURES 3 and 6 discloses that a product, which has both a suitable viscosity level and suitable contamination level, is formed with conditions as follows:

172° F., 74% R.H., 30 to 60+ min.; and
172° F., 85% R.H., 8.5 to 60+ min.

Similarly, the following conditions are satisfactory for providing gum tragacanth with a commercially suitable viscosity value at a temperature of 190° F., as evidenced by FIGURE 4:

50% R.H. with a maximum time of 22.5 min.;
64% R.H. with a maximum time of 37.5 min.;
74% R.H. with a maximum time of 27 min.; and
85% R.H. with a maximum time of 7 min.

As shown in FIGURE 7, the following conditions are suitable for providing an end product at 190° F. with a suitable contamination value:

50% R.H. with a minimum time of 8 min.;
64% R. H. with a minimum time of 5 min.;
74% R.H. with a minimum time of 6.5 min.; and
85% R.H. with a minimum time of 8 min.

Combining the results of FIGURE 4 and FIGURE 7, it is manifest that the following conditions are also satisfactory for treaed gum tragacanth to provide a product with the desired viscosity measurement and the desired contamination measurement:

190° F., 50% R.H., 8 to 22.5 min.;
190° F. 64% R.H., 5 to 37.5 min.; and
190° F., 74% R.H., 6.5 to 27 min.

It is evident that this example also demonstrates the following generalizations. Firstly, the reduction in the S.P.C. value appears to approach commercial acceptability after 20 minutes of treatment regardless of the humidity or temperature conditions employed within the ranges covered herein. Secondly, increasing the humidity, at a constant time and temperature, increases the bacteriological purification. Thirdly, the degree of bacteriological purification is increased as the temperature is increased with the time and humidity being constant. Fourthly, purification at 160° F. provides a minimum degradation of gum viscosity; furthermore, at this temperature, the damage to the product is decreased as the humidity is increased. Fifthly, 170° F. appears to be a transition with respct to gum degradation, since minute variations in time or humidity may either increase or decrease its viscosity. Lastly, the viscosity of the gum is decreased when it is treated at 190° F.

Having set forth the general nature and specific embodiments of the present invention, the scope is now particularly pointed out in the appended claims.

What is claimed is:

1. A process which comprises:
    (a) placing dry powdered gum tragacanth with an unacceptable standard plate count value and an acceptable starting viscosity in a ¼" thick layer in a chamber;
    (b) heating said layers at a temperature between 160° and 190° F. and a relative humidity between 50 and 85%;
    (c) drying said heated gum at ambient humidity for 15 minutes; and
    (d) cooling said dried gum to provide a powdered product therefrom with a maximum standard plate count value of 200,000 per gram and a viscosity value of at least 85% of said starting viscosity.

2. The process according to claim 1 in which the temperature is 160° F. and the relative humidity is 64% with the time being 58 to 60 min.

3. The process according to claim 1 in which the temperature is 160° F. and the relative humidity is 74% with the time being 21 to 60 min.

4. The process according to claim 1 in which the temperature is 160° F. and the relative humidity is 85% with the time being 7 to 60 min.

5. The process according to claim 1 in which the temperature is 172° F. and the relative humidity is 74% with the time being 30 to 60 min.

6. The process according to claim 1 in which the temperature is 172° F. and the relative humidity is 85% with the time being 8.5 to 60 min.

7. The process according to claim 1 in which the temperature is 190° F. and the relative humidity is 50% with the time being 8 to 22.5 min.

8. The process according to claim 1 in which the temperature is 190° F. and the relative humidity is 64% with the time being 5 to 37.5 min.

9. The process according to claim 1 in which the temperature is 190° F. and the relative humidity is 74% with the time being 6.5 to 27 min.

10. A process which comprises:
    (a) placing a dry powdered natural gum selected from the group consisting of gum tragacanth, gum arabic, karaya, acacia, alginates, Irish moss, mesquite gum, damson gum, slippery elm mucilage, flaxseed mucilage, mannoglactans and glucomannans with an unacceptable standard plate count value and an acceptable starting viscosity in a layer in a chamber; and
    (b) heating said layer at a temperature between about 160° and 190° F. and a relative humidity between about 50 and 85% to provide a powered product therefrom with an acceptable standard plate count value and with an acceptable viscosity level.

(References on following page)

References Cited by the Examiner

UNITED STATES PATENTS

| | | | |
|---|---|---|---|
| 2,205,886 | 6/1940 | Jungmann | 260—209 X |
| 2,380,115 | 7/1945 | Leo et al. | 260—209 X |
| 3,146,200 | 8/1960 | Goldstein et al. | 260—209 |

OTHER REFERENCES

Frobisher, M.: Fundamentals of Microbiology, pages 278–281 (1962); sixth edition, pages 267–270 (1957).

Gabel: Chem. Abstracts, vol. 23, page 3592 (1929).

Heinemann, P. G.: Chem. Abstracts, vol. 7 (1913), page 2772.

LEWIS GOTTS, *Primary Examiner.*

CHARLES B. PARKER, *Examiner.*